United States Patent [19]

Lincoln

[11] 3,876,691

[45] Apr. 8, 1975

[54] PROCESS FOR THE HYDROLYSIS OF NITRILES

[75] Inventor: Robert M. Lincoln, Moylan, Pa.

[73] Assignee: Atlantic Richfield Company, Los Angeles, Calif.

[22] Filed: Apr. 16, 1973

[21] Appl. No.: 351,696

[52] U.S. Cl. ...... 260/515 R; 260/514 R; 260/515 P; 260/526 N; 260/537 R; 260/540; 260/541; 260/537 N
[51] Int. Cl. ............................................. C07c 51/08
[58] Field of Search ......... 260/515 R, 526 N, 515 P

[56] References Cited
UNITED STATES PATENTS

| | | | |
|---|---|---|---|
| 2,026,894 | 1/1936 | Hill | 260/526 |
| 2,143,941 | 1/1939 | Crawford | 260/526 |

OTHER PUBLICATIONS

Linetskii et al., Chem. Abstracts, vol. 62, (1965), p. 15745b.

Mellor's Modern Inorganic Chem. QD151, M52 (1939), p. 637.

Adkins (ed.) Organic Syntheses, Vol. 26, pp. 54–56, (1946), QD262.07.

Shriner (ed.) Organic Syntheses, Vol. 27, pp. 1–2 (1947), QD262.07.

*Primary Examiner*—James A. Patten
*Attorney, Agent, or Firm*—Delbert E. McCaslin

[57] ABSTRACT

Nitriles of the formula $R-(CN)_r$ are hydrolyzed with an aqueous solution of barium hydroxide thereby producing the barium salt of the carboxylic acid corresponding to the nitrile. In an additional embodiment of the invention, ammonia and then carbon dioxide are added to the barium salt solution to precipitate barium carbonate for recovery and reuse and the carboxylic acid remains in solution as its ammonium salt. In an additional particular embodiment of the invention the ammonium salt is thermally converted to the acid and ammonia. The ammonia can be recycled or converted to ammonium phosphate, for example, which has many large volume uses including use as a fertilizer.

4 Claims, No Drawings

PROCESS FOR THE HYDROLYSIS OF NITRILES

BACKGROUND OF THE INVENTION

In recent years commercial processes for ammoxidation of olefins have made alkenyl nitriles, such as acrylonitrile and methacrylonitrile, available at prices attractive for the manufacture of acrylate esters and methacrylate esters.

At the present time, however, there is no completely satisfactory method for the conversion of alkenyl nitriles to alkenyl acids or alkenyl esters.

Acid hydrolysis using sulfuric acid is used commercially for making acrylamide from acrylonitrile and by further heating with water the acrylamide sulfate can be hydrolyzed to acrylic acid producing ammonium sulfates. Both acrylamide and acrylic acid production by sulfuric acid result in by-product formation of ammonium sulfates.

The by-product formation of ammonium sulfates presents a difficult handling and waste disposal problem. By-product ammonium sulfates amount to from 2 to 3 pounds per pound of acrylate produced. Increasing concern about water pollution can only mean an increasing and costly by-product disposal problem for the sulfuric acid hydrolysis process.

Alkaline hydrolysis of alkenyl nitriles is reported in the literature using alkali metal hydroxides. Two problems result however, first, undesirable quantities of beta-hydroxy compounds and the corresponding ethers are formed; and second, the acids are produced as their sodium salts, which results in a sodium ion disposal problem and thus does not avoid the ecological problems.

With respect to aromatic nitriles, such as terephthalonitrile, the same problems exist. For example, sodium hydroxide can be used for hydrolysis, but again the sodium ion disposal problem exists. It is also known that ammonia at high temperatures and for extended times will hydrolyze nitriles but this process also has problems. In the first place pressure equipment is required and in any long reaction time, yields suffer because of by-product formation and in the case of aromatics such by-products are frequently color bodies which degrade product quality.

An expensive and complicating factor of polyester production as currently practiced is purification of dimethyl terephthalate or terephthalic acid prior to polycondensation with ethylene glycol. The presence of small amounts, 25 ppm for example, of aromatic aldehydes such as paracarboxybenzaldehyde and of residual transition metal catalysts, results in chain termination and inferior quality polyester.

Several methods have been proposed to avoid these problems, for example, by the direct conversion of aromatic nitriles to esters by reacting the nitrile with ethylene glycol or ethylene oxide in the presence of metal catalysts at high temperatures, i.e 190° C. or more, for very long times. These methods produce the bis-beta-hydroxyethyl ester of terephthalic acid and no evidence of product purity is shown.

The method of the present invention avoids all of the problems of the prior art. The corresponding acid is produced as a readily purifiable salt in aqueous solution, the hydrolysis agent is easily separated and can either be recycled or employed in other processes and the by-products, instead of presenting ecological problems can be converted to highly useful products. The hydrolysis reaction is rapid, moderate conditions are employed and expensive pressure or other complex equipment is completely avoided.

SUMMARY OF THE INVENTION

In accordance with this invention nitriles of the formula $R+CN)_x$, to be described more fully hereinafter, but which can be, for example, either aliphatic or aromatic are hydrolyzed with an aqueous solution of barium hydroxide. This results in the production of the barium salt of the carboxylic acid corresponding to the nitrile. This barium salt is in the aqueous solution and the barium can be precipitated as the carbonate simply by adding ammonium carbonate, for example, or in a more preferred embodiment which would offer greater commercial possibilities gaseous ammonia and then carbon dioxide are introduced into the solution and the barium carbonate precipitates leaving dissolved the ammonium salt. The diammonium salts are valuable intermediates and can be employed to produce esters by reaction with ethylene glycol, as taught in U.S. Pat. No. 2,979,526 for example. The ammonium salts may be recovered by conventional techniques such as evaporation of excess water or recrystallization from a suitable solvent. The ammonium salts can be converted thermally to the acid and gaseous ammonia. The ammonia can be recycled to the process or converted to useful salts such as ammonium phosphate thereby avoiding any ecological problems.

The barium carbonate on heating with carbon to about 1300° C. is converted to barium oxide and carbon monoxide which is a useful chemical while the barium oxide need only be added to water to produce the barium hydroxide solution for the hydrolysis step.

It is an object of this invention to provide a method for the hydrolysis of nitriles.

It is another object of this invention to provide a method for the hydrolysis of nitriles employing barium hydroxide in aqueous solution as the hydrolyzing agent.

It is another object of this invention to provide a method for the hydrolysis of nitriles employing an aqueous solution of barium hydroxide as the hydrolyzing agent, converting the resulting barium salt of the carboxylic acid corresponding to the nitrile to the corresponding ammonium salt and precipitating the barium as the carbonate.

It is another object of this invention to convert the barium salt of the carboxylic acid corresponding to the nitrile hydrolyzed by an aqueous solution of barium hydroxide to the ammonium salt and the barium to the carbonate by addition of gaseous ammonia and carbon dioxide to the aqueous barium salt solution and separating the precipitated barium carbonate for reuse.

Other objects of this invention will be apparent from the description of the invention which follows and from the claims.

DESCRIPTION OF THE INVENTION

The nitriles which can be hydrolyzed in accordance with the method of this invention have the structure $R+CN)_x$ wherein R is a hydrocarbon group having from 1 to 10 carbon atoms and $x$ is an integer of from 1 to 4. Preferred nitriles of this structure are those wherein R is a member selected from the group consisting of an aromatic hydrocarbon radical having from 6 to 10 carbon atoms, an alkyl hydrocarbon radical having 1 to 10 carbon atoms or more preferably 1 to 8 carbon atoms, an alicyclic hydrocarbon radical and having from 4 to 8 carbon atoms and an olefinic hydrocarbon radical having from 2 to 10 carbon atoms and more preferably from 2 to 8 carbon atoms, and $x$ is 1 or 2. Specific examples of the preferred nitriles for use in this invention are acetonitrile, propionitrile, butyronitrile, valeronitrile, capronitrile, acrylonitrile, methacrylonitrile, crotononitrile, maleic dinitrile, glutaronitrile, succinonitrile, adiponitrile, cyclobutane-1,2-dicyanide, benzonitrile, terephthalonitrile, isophthalonitrile, phthalonitrile, cyclohexane acetonitrile, cyclohexene acetonitrile, the tolunitriles, the naphthonitriles, and the like as well as others not specifically named.

The barium hydroxide solution can either be made by dissolving barium oxide in water as will be described more fully or by the use of the octahydrate, $Ba(OH)_2 \cdot 8 H_2O$. The amount of the hydroxide is preferably the stoichiometrical equivalent of the nitrile. Thus with 1 mole of methacrylonitrile which has only 1 nitrile group it is necessary to employ only one-half mole of the barium hydroxide. Merely for convenience in the event that the barium hydroxide is not 100 percent pure, a small excess of the hydroxide is used, but this is not critical.

The hydrolysis reaction preferably is carried out at reflux temperatures of the reaction medium at atmospheric pressure preferably and, in general, this will range in temperature from about 90° C. to 102° C.-105° C. The reflux temperature generally increases during the reaction due to the formation of the carboxylic acid salt which will increase the boiling point of the reaction medium while the lower boiling nitrile disappears. The reaction time can range from 1 to 12 hours for example depending upon the particular nitrile being hydrolyzed since some nitriles hydrolyze more readily than others. The extent of the reaction can be followed by the amount of ammonia evolved.

Since oxygen tends to cause polymerization and other undesirable side reactions the hydrolysis is carried out preferably in an inert atmosphere, for example, nitrogen or argon, nitrogen being a convenient inert gas to employ. It has also been found that a small amount of a polymerization inhibitor such as copper either in the form of the bulk metal or as powder or a combination of both may be employed in the hydrolysis reaction medium in the hydrolysis of alkenyl nitriles. This amount is not critical and can be as small as 0.01 grams per mole of nitrile or as much as 10 grams per mole, for example. The larger amounts were used in the experiments which follow simply as a matter of convenience. The copper employed in the nitrile hydrolysis processes as a polymerization inhibitor can be recovered unchanged for reuse.

It is well known to use polymerization inhibitors in acid hydrolysis in alkenyl nitriles. Generally these are hydroquinones, particularly the monomethylether of hydroquinone. The hydroquinones are not effective in alkaline hydrolysis since they dissolve in the aqueous phase as salts. It has also been proposed to use copper in acid hydrolysis, but in such reactions the copper dissolves and forms copper sulfate, for example, when sulfuric acid is used as a hydrolyzing agent. It was unexpected therefore that the copper metal was effective as a polymerization inhibitor in the instant hydrolysis process.

A method for carrying out the hydrolysis reaction involves introducing the desired amount of barium hydroxide aqueous solution with a small amount of copper into the reactor, purging the reactor with nitrogen, and then adding the nitrile. The nitrile is generally present as a separate liquid upper layer. The mixture is then heated with stirring to reflux temperatures for from 1 to 12 hours depending upon the particular nitrile being hydrolyzed. Ammonia is evolved during the reaction and can be collected for use as will be described. The following Examples are provided to illustrate the invention in additional detail.

EXAMPLE I

Into a glass reaction flask fitted with a reflux condenser, thermometer and a glass tube for introducing a slow stream of nitrogen, the reactants were added.

| 6.7 g. | (0.100 M) | Methacrylonitrile |
| 17.4 g. | (0.055 M) | $Ba(OH)_2 \cdot 8 H_2O$ |
| 30.6 g. | | Water |
| 1.0 g. | | Copper powder + Copper Metal |

The barium hydroxide was present as a solution in water. The nitrile was present as a separate liquid upper layer. The mixture was heated to 92° to 102° C. for four hours during which time 86 percent of the theoretical yield of gaseous ammonia was collected by bubbling the effluent gas through 1 N HCl.

Acidification of the colorless, homogeneous reaction solution by dilute sulfuric acid precipitated the barium ion as barium sulfate. Analysis of the filtrate by gas chromatography showed 86 percent of the theoretical yield of methacrylic acid.

The copper was present as a polymerization inhibitor. It remained as a solid during the reaction and was recoverable, apparently, unchanged.

EXAMPLE II

The conditions of Example I were repeated with no copper present. After four hours at 91° to 102° C., 82 percent of the theoretical amount of ammonia was collected.

Analysis of the aqueous reaction solution as described in Example I, showed 49 percent of the theoretical yield of methacrylic acid.

During the hydrolysis, there waas formed a gummy, water insoluble solid. Inspection of this solid by infrared analysis proved it was an oligomer containing both carboxylic acid and nitrile groups attached to a polyisopropenyl backbone.

This shows that the absence of copper allows polymerization, in addition to hydrolysis. The presence of metallic copper is, therefore, desirable both to improve the rate of hydrolysis and to prevent polymerization.

EXAMPLE III

Using the conditions described in Example I, but substituting 2.80 grams (0.05 M) of calcium oxide for the barium hydroxide yielded ammonia at a very slow rate. During 1½ hours, the ammonia collected was only 1 percent of theoretical.

Adding 1.0 grams of barium hydroxide octahydrate to perhaps act catalytically with the calcium oxide had little effect, the rate of ammonia liberation increased to 4 percent per hour. This compares with 50 percent ammonia formation per hour during the first hour in Example I where the hydrolyzing agent was barium hydroxide.

Calcium oxide, as well as calcium hydroxide, is very insoluble in water. In an attempt to modify their water solubility and, thereby assist nitrile hydrolysis, sequestering agents such as nitrilotriacetic acid and ethylenediamine tetra-acetic acid were included at levels up to 50 percent of the calcium oxide weight. Ammonia formation was zero, indicating that no hydrolysis was occurring.

These runs demonstrate that barium hydroxide is unique in its ability to hydrolyze nitriles as compared with the other most common alkaline earth metal hydroxide, calcium hydroxide.

EXAMPLE IV

An aqueous solution of barium methacrylate, such as resulting from the barium hydroxide hydrolysis of methacrylonitrile as described in Example I, and known to contain 18.6 weight percent barium methacrylate was treated with gaseous carbon dioxide, no precipitate separated. By adding a molecular equivalent of ammonia to the solution and then adding gaseous carbon dioxide, barium carbonate separated quantitatively. Filtration followed by room temperature evaporation of the aqueous filtrate yielded the ammonium salt of methacrylic acid.

EXAMPLE V

In order to demonstrate that aromatic nitriles can be hydrolyzed by the method of this invention a run was carried out wherein 15.8 grams (0.05 moles) of barium hydroxide octahydrate was dissolved in 160 grams of water and placed in a 3-necked round bottom flask. After the air had been purged from the flask with nitrogen, 10.3 grams of benzonitrile (0.10 moles) were added and the mixture was refluxed (with nitrogen bubbling through) until the evolution of ammonia stopped. The nitrogen and ammonia gases were bubbled through a 1 N HCl solution. The ammonia evolved at the rate of 38 percent theoretical per hour during the initial stages of the reaction, then decreased with decreasing nitrile concentration. Overall ammonia production was 79 percent of theoretical. It was not found necessary to employ a polymerization inhibitor in the hydrolysis of the aromatic nitriles.

After ammonia evolution stopped (10.5 hours total reflux time) the colorless water solution on cooling to room temperature deposited well-formed colorless leaflets as a precipitate.

By infra-red analysis and comparison with the spectrum of barium benzoate synthesized from the reaction of benzoic acid with barium hydroxide the hydrolysis product was identified as barium benzoate.

EXAMPLE VI

In order to demonstrate that the barium salts of aromatic carboxylic acids, in particular benzoic and phthalic salts could be converted to ammonium salts, the barium benzoate was treated with an excess of ammonium carbonate in water solution. On adding ammonium carbonate to barium benzoate dissolved in water an essentially quantitative yield of barium carbonate precipitated. After filtration, evaporation of water from the filtrate left ammonium benzoate in the form of colorless crystals. The infra-red spectrum of such crystals was identical with an authentic sample of ammonium benzoate. This run demonstrated that the method of utilizing ammonia and carbon dioxide to make the ammonium salt and precipitate barium carbonate as described in Example IV, is also suitable for converting the aromatic carboxylic acid barium salts to ammonium salts. If desired, the ammonium salts of the aromatic acids can be thermally decomposed with the evolution of ammonia to produce the acids in accordance with the teachings of British Pat. No. 801126.

EXAMPLE VII

In another run terephthalonitrile was hydrolyzed with an equivalent amount of aqueous barium hydroxide, i.e. a 1:1 mole ratio of nitrile to the hydroxide, as described in the run in Example V. Infra-red analysis showed the production of the barium salt of terephthalic acid. Likewise isophthalonitrile is hydrolyzed to the barium salt of isophthalic acid.

EXAMPLE VIII

The barium salt of terephthalic acid in solution prepared in Example VII was treated with ammonium carbonate in water. This caused barium carbonate to precipitate. After filtration, the filtrate was evaporated and it was found by infra-red analysis that the solid material left after evaporation was primarily the diammonium salt of terephthalic acid with a small amount of terephthalic acid having only one of the acid groups neutralized, i.e. the monoammonium salt of the acid. This indicated that some ammonia had been lost during evaporation leaving the partially neutralized acid.

The foregoing Examples demonstrate the unique property of aqueous barium hydroxide in the hydrolysis of nitriles, the ease of recovery and reuse of the barium hydroxide and the avoidance of production of non-useful or polluting by-products.

I claim:

1. A method for hydrolyzing a nitrile selected from the group consisting of acrylonitrile, methacrylonitrile, benzonitrile, terephthalonitrile and isophthalonitrile which comprises contacting said nitrile with an aqueous solution of barium hydroxide at a temperature of from 90°C. to 105°C. in an inert atmosphere of nitrogen and in the presence of a metallic copper polymerization inhibitor for a period sufficient to produce the barium salt solution of the carboxylic acid corresponding to said nitrile, contacting said barium salt solution with gaseous ammonia and then with carbon dioxide to precipitate barium carbonate and produce a solution of the ammonium salt of the carboxylic acid, separating said barium carbonate from said ammonium salt solution and acidifying said ammonium salt solution with a mineral acid to produce the carboxylic acid and the corresponding ammonium salt of the mineral acid and recovering said carboxylic acid and said ammonium salt of the acid.

2. The method according to claim 1 wherein the precipitated barium carbonate is separated from said ammonium salt solution and said carbonate is heated in the presence of carbon to produce barium oxide and carbon monoxide, and thereafter the barium oxide is dissolved in water to produce barium hydroxide for reuse as the hydrolyzing agent.

3. The method according to claim 1 wherein the mineral acid is phosphoric acid and the salt produced is ammonium dihydrogen phophate.

4. The method according to claim 1 wherein the amount of barium hydroxide is at least the stoichiometrical equivalent of said nitrile.

* * * * *